UNITED STATES PATENT OFFICE.

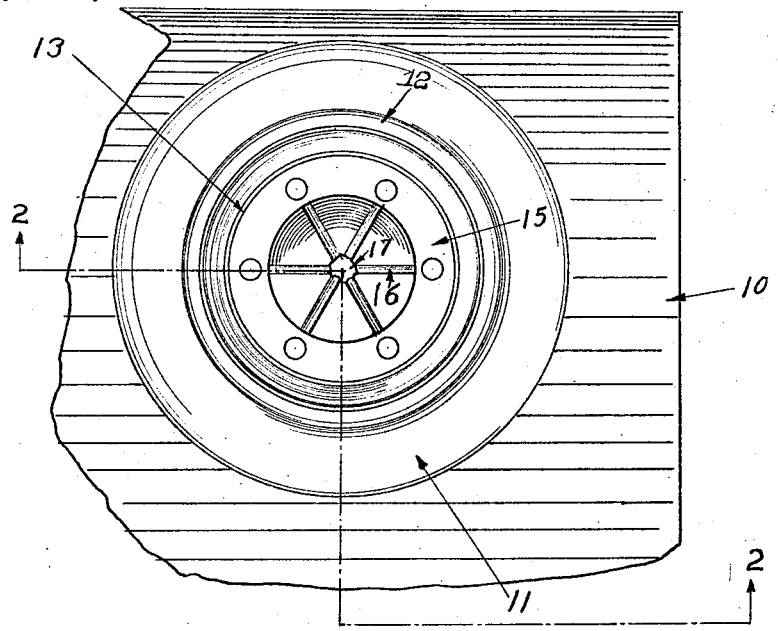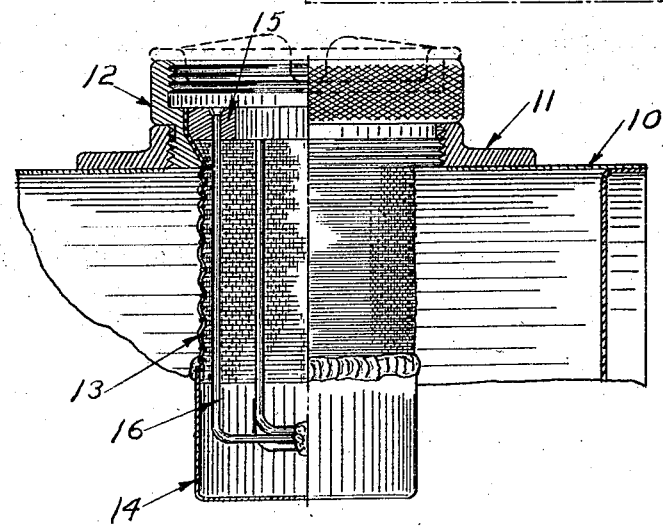

WILLIAM E. BROCK, OF INDIANAPOLIS, INDIANA.

FUEL STRAINER FOR TANKS.

1,415,217.                     Specification of Letters Patent.      Patented May 9, 1922.

Application filed September 15, 1919. Serial No. 323,986.

*To all whom it may concern:*

Be it known that I, WILLIAM E. BROCK, a citizen of the United States, and a resident of Indianapolis, county of Marion, and State of Indiana, have invented a certain new and useful Fuel Strainer for Tanks; and I do hereby declare that the following is a full, clear, and exact description thereof, reference being had to the accompanying drawings, in which like numerals refer to like parts.

This invention relates to a strainer particularly adapted for use in gasoline tanks for motor driven vehicles, stationary engines and storage for the purpose of straining the gasoline and withholding all impurities therefrom and separating water from the gasoline and preventing its entering the tank.

The main feature of this invention is the construction of the straining means of very fine wire mesh and suitably securing thereto in depending relation, a sump member for the collection of the impurities in the hydrocarbon fluids and other liquids such as water and the like which are of heavier density than the hydrocarbon fluid fuel.

A further feature of this invention is the construction of the strainer whereby the fine wire mesh used therein will be protected from a discharge nozzle or funnel inserted therein, and also from the pressure under which the gasoline is forced into the tank at modern pumping stations.

Another advantage obtained by the construction made herein is the sheet metal bottom of the strainer prevents the water and other impurities from being discharged directly downward through the strainer under high entrance pressure by causing the fluid to be deflected at the bottom and pass upwardly and then filter through the sides of the strainer under reduced pressure, thereby retaining the impurities and water within the mesh and permitting the gasoline to pass through the same.

Referring to the drawings, which are made a part of this application, Fig. 1 shows a plan view of a gasoline tank with the strainer mounted therein and the cap removed. Fig. 2 is a cross section taken on the line 2—2 of Fig. 1.

In the drawings there is shown a gasoline tank 10 provided with an internally threaded inlet opening 11 in which is ordinarily mounted a cap for closing the inlet to the tank. Such a cap is removed and in its place the strainer is inserted and supported by the supporting member 12, which is externally threaded so as to screw into the inlet opening 11, and internally threaded to receive a cap which may be the one originally used in opening 11 for closing the opening therethrough, which is not shown herein.

The strainer consists of a cylindrical wire mesh 13 or other material of very fine weave which will permit gasoline to pass therethrough, but will prevent the passage of water or impurities and retain them within the strainer. Secured to the wire mesh or other material at its lower end, and depending therefrom, there is a metal cup or plate 14 forming the bottom of the strainer and closed so as to prevent any passage of fluid therethrough. Mounted in the inner periphery of the supporting member 12, and seated therein, there is a ring 15 having depending therefrom a plurality of downwardly extending metal loops or rods 16 which lie adjacent the inner surface of the strainer and wire mesh or other material 13. The rods 16 turn at right angles and extend radially inwardly to meet at a common point 17 for retaining them in rigid position and prevent a discharge nozzle from coming in contact with the screen 13 or the cup 14 and ripping and tearing holes therein. For this purpose the rods 16 form an inner protecting skeleton for preventing the destruction or mutilation of the strainer. The radial extensions of the rods 16 also serve to break the force of the pressure supplied fluid and to scatter and break up the ascending fluid streams reflected by the cup 14.

The downward discharge of the fluid under high pressure would force the water and impurities through the screen if it formed the bottom of the strainer, but the cup 14 overcomes this and causes the downward stream to be deflected and the fluid to pass through the peripheral walls of the strainer. The pressure and force being broken, the fine mesh screen or other strainer material will retain the impurities and water, which settle in the cup or sump 14 after the fluid supplying nozzle is removed.

The screen 13 is secured in the supporting member 12 by the ring 15 which has its lower outer peripheral edge beveled so as to coincide with the tapered portion of the member 12, whereby the upper portion of the screen 13 is mounted between them and is secured by simply pressing the ring 15 into place. The screen may also be removed by removing the ring 15.

The invention claimed is:

1. A strainer for fluid containers including a tubular straining and separating member, a depending cup secured to said tubular member for closing the same, means for supporting said straining member within said container, a plurality of metal rods forming a skeleton cylinder suspended from said means and extending into said straining member, said wire rods being bent inwardly at their outer ends and joined together to form a rigid skeleton bottom for preventing any downward thrust of a discharge nozzle from engaging and damaging the straining member and said cup, and for dissipating the pressure of the fluid supplied by the nozzle and reflected by the cup.

2. In combination with a fluid container having a threaded opening therein and a threaded cap therefor, of a strainer attachment including a supporting member having external threads adapted to screw into the threads of said opening and internal threads adapted to receive the threaded cap for normally closing said opening, a frame suspended from said supporting member so as to extend within said container, a tubular straining member adapted to surround said frame and be protected by said frame, said straining member separating the liquids of different densities and the foreign particles or impurities therein as it is fed into said container, an imperforate cup secured to said enclosing tubular straining member for closing the same, and a skeleton bottom formed by the frame and positioned adjacent the imperforate cup to protect the same from being damaged by the downward thrust of the nozzle and the fluid pressure supplied thereby, said bottom skeleton framework dissipating the pressure of the upwardly directed fluid deflected by the cup, said cup being adapted to act as a sump and receive the foreign particles of the pressure supplying fluid and the heavier fluids such as water which have been separated from the lighter fluids discharged into the container through said straining means.

In witness whereof, I have hereunto affixed my signature.

WILLIAM E. BROCK.